United States Patent
Nomura et al.

(10) Patent No.: US 6,819,502 B2
(45) Date of Patent: Nov. 16, 2004

(54) STRUCTURE OF A ZOOM LENS BARREL

(75) Inventors: Hiroshi Nomura, Saitama (JP); Yoshihiro Yamazaki, Saitama (JP); Isao Okuda, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/771,419

(22) Filed: Feb. 5, 2004

(65) Prior Publication Data

US 2004/0160683 A1 Aug. 19, 2004

(30) Foreign Application Priority Data

Feb. 5, 2003 (JP) ........................................ 2003-028631

(51) Int. Cl.⁷ .............................................. G02B 15/14
(52) U.S. Cl. ...................... 359/701; 359/700; 359/699; 359/704
(58) Field of Search ................................ 359/699–701, 359/704, 823

(56) References Cited

U.S. PATENT DOCUMENTS

| | | |
|---|---|---|
| 5,488,513 A | 1/1996 | Tanaka |
| 5,589,987 A | 12/1996 | Tanaka |
| 6,469,840 B2 | 10/2002 | Nomura et al. |
| 6,519,096 B2 * | 2/2003 | Nomura et al. ............. 359/700 |
| 6,624,955 B2 * | 9/2003 | Nomura et al. ............. 359/823 |
| 6,636,362 B2 * | 10/2003 | Nomura et al. ............. 359/701 |
| 6,643,074 B2 * | 11/2003 | Nomura et al. ............. 359/700 |
| 6,657,794 B2 | 12/2003 | Nomura et al. |
| 6,665,129 B2 * | 12/2003 | Nomura et al. ............. 359/700 |

FOREIGN PATENT DOCUMENTS

JP 2001-215385 8/2001

* cited by examiner

Primary Examiner—Ricky Mack
(74) Attorney, Agent, or Firm—Greenblum & Bernstein, P.L.C.

(57) ABSTRACT

A zoom lens barrel includes a cam ring which is driven to rotate; a first lens frame which is positioned around the cam ring, supports a frontmost lens group of a zoom lens system, and includes a first cam follower; a light-shield exterior ring positioned around the first lens frame, and includes a second cam follower; and first and second outer cam grooves formed on an outer peripheral surface of the cam ring so that the first and second cam followers are engaged in the first and second outer cam grooves, respectively. The second cam follower is engaged in the second outer cam groove through a linear guide slot formed on the first lens frame. Zooming ranges of the first and second outer cam grooves are shaped so as to move the first lens frame and the light-shield exterior ring in the same moving path.

10 Claims, 19 Drawing Sheets

STRUCTURE OF A ZOOM LENS BARREL

BACKGROUND OF THE INVENTION

1. Field of the Invention

The present invention relates to a structure of a zoom lens barrel, and more specifically relates to a structure of a zoom lens barrel for moving a first lens frame along an optical axis by rotation of a cam ring which is driven to rotate, wherein the first lens frame supports the frontmost lens group among a plurality of lens groups of the zoom lens barrel.

2. Description of the Related Art

In conventional zoom lens barrels, it is often the case that a first lens frame which supports the first lens group (frontmost lens group) among a plurality of lens groups of the zoom lens barrel is moved along an optical axis by rotation of a cam ring which is driven to rotate. In the case where a zooming adjustment (which is an adjustment operation that is carried out in a manufacturing process of the zoom lens barrel as needed) is carried out by moving the second lens group positioned behind the first lens group relative to the first lens group, it is generally the case that an opening for this zooming adjustment is formed on the first lens frame while an independent light-shield exterior ring is fitted on the first lens frame to cover the opening in a light-tight fashion. This light-shield exterior ring is simply fixed to the first lens frame in conventional zoom lens barrels.

SUMMARY OF THE INVENTION

The present invention provides an improved structure of a zoom lens barrel for moving the first lens frame along an optical axis by rotation of a cam ring which is driven to rotate, wherein the structure provides a light-shield exterior ring so as to be multi-functional.

According to an aspect of the present invention, a zoom lens barrel is provided, including a cam ring which is driven to rotate; a first lens frame which is positioned around the cam ring to be guided linearly along an optical axis, the first lens frame supporting a frontmost lens group of a zoom lens system; a light-shield exterior ring which is positioned around the first lens frame; a first outer cam groove and a second outer cam groove which are formed on an outer peripheral surface of the cam ring, each the first and second cam grooves including a zooming range for performing a zooming operation of the zoom lens system; and a first cam follower formed on the first lens frame, the first cam follower being engaged in the first outer cam groove; a second cam follower formed on the light-shield exterior ring, the second cam follower being engaged in the second outer cam groove through a linear guide slot which is elongated in a direction parallel to the optical axis, which is formed on the first lens frame. The first outer cam groove and the second outer cam groove are shaped so as to move the first lens frame and the light-shield exterior ring in the same moving path in the zooming ranges thereof.

It is desirable for the zoom lens barrel to include a lens barrier unit including at least one barrier blade, wherein the lens barrier unit is supported by the light-shield exterior ring at a front end thereof, and retracting ranges of the first outer cam groove and the second outer cam groove are shaped so that the light-shield exterior ring advances from a photographing position thereof relative to the first lens frame to position the lens barrier unit in front of the frontmost lens group without the lens barrier unit interfering with the frontmost lens group when the zoom lens barrel is retracted to a retracted position thereof.

It is desirable for the first lens frame to include an outer ring portion, an inner ring portion and a flange wall by which a front end of the outer ring portion and a front end of the inner ring portion are connected, and the cam ring to be positioned between the outer ring portion and the inner ring portion.

It is desirable for the zoom lens barrel to include a second lens frame which is positioned inside the inner ring portion, and is guided linearly along the optical axis, wherein at least one opening, through which the position of a lens group supported by the second lens frame in the optical axis direction, can be adjusted is formed on the first lens frame.

It is desirable for the zoom lens barrel to include a biasing member, positioned between the first lens frame and the light-shield exterior ring, for biasing the light-shield exterior ring forward relative to the first lens frame.

It is desirable for the biasing device to be a compression coil spring.

The opening can include at least one outer opening formed on the outer ring portion, and at least one inner opening formed on the inner ring portion. The outer opening and the inner opening are aligned in a radial direction of the zoom lens barrel.

It is desirable for the zoom lens barrel to include a stationary barrel having a female helicoid formed on an inner peripheral surface of the stationary barrel. A male helicoid is formed on an outer peripheral surface of the cam ring to be engaged with the female helicoid. A spur gear which is engaged with a drive pinion is formed on thread of the male helicoid.

It is desirable for the zoom lens barrel to include a second lens frame which is positioned inside the inner ring portion, is guided linearly along the optical axis, and includes a third cam follower; and an inner cam groove formed on an inner peripheral surface of the cam ring so that the third cam follower is engaged in the third cam groove.

It is desirable for the distance in the optical axis direction between said first cam groove and of said second cam groove changes from a predetermined position within a range before said zoom range.

The present disclosure relates to subject matter contained in Japanese Patent Application No. 2003-028631 (filed on Feb. 5, 2003) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
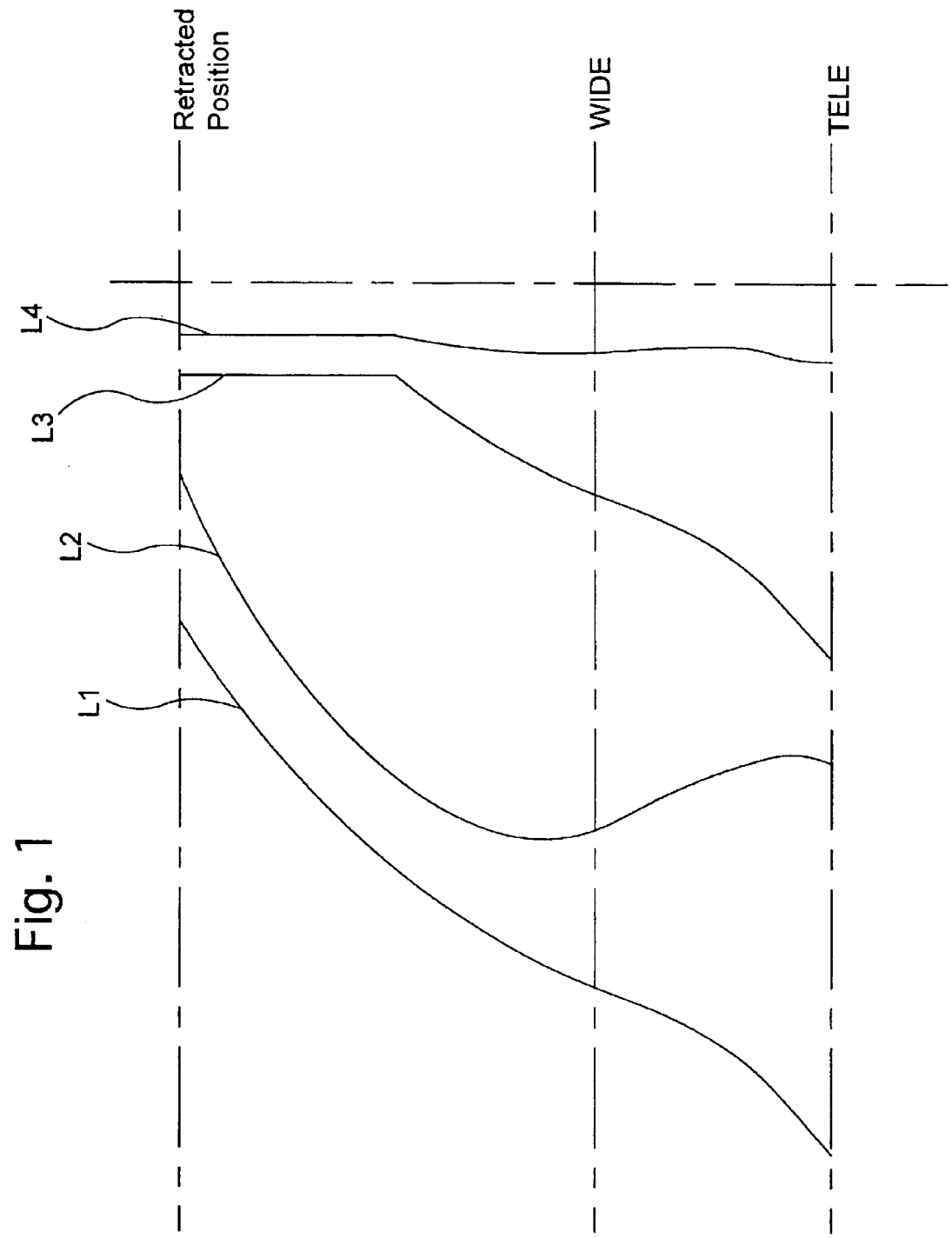
FIG. 1 is a diagram showing reference moving paths of zoom lens groups of a zoom lens system provided in an embodiment of a zoom lens barrel according to the present invention.
Figure 2:
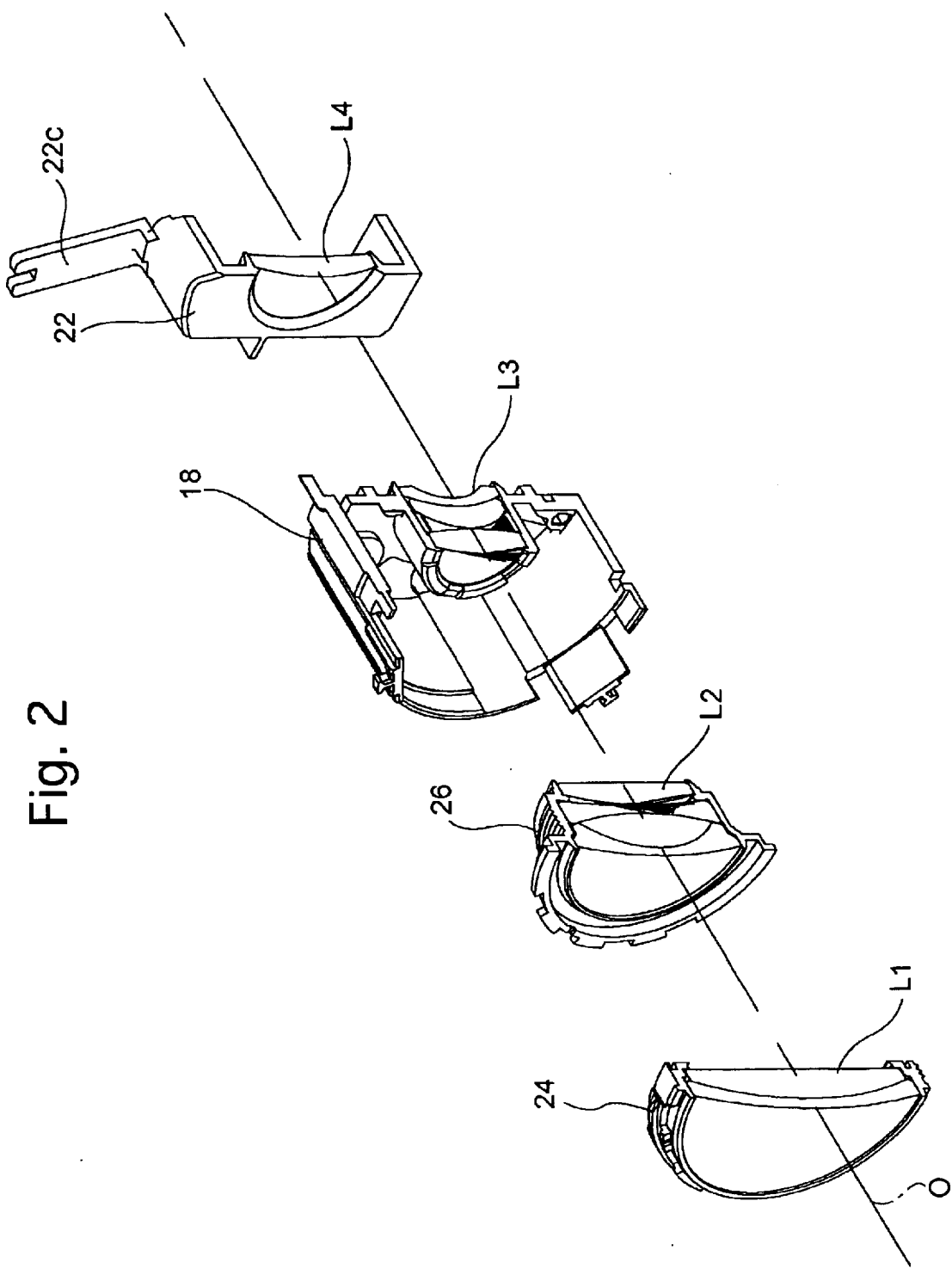
FIG. 2 is an exploded perspective view in axial section of the zoom lens groups and lens support frames.

First of all, a zoom lens system (zoom lens optical system) provided in an embodiment of a zoom lens barrel of a camera according to the present invention will be hereinafter discussed with reference to FIGS. 1 through 5. The zoom lens system of the zoom lens barrel 10 is a vari-focal lens system consisting of four lens groups: a positive first lens group L1, a negative second lens group L2, a positive third lens group L3 and a negative fourth lens group L4, in that order from the object side (left side as viewed in FIG. 3). The first through third lens groups L1, L2 and L3 are moved relative to one another along an optical axis O to vary the focal length of the zoom lens system and the fourth lens group L4 is moved along the optical axis O to make a slight focus adjustment, i.e., to adjust a slight focus deviation caused by the variation of the focal length. During the operation of varying the focal length of the zoom lens system between wide angle and telephoto, the first lens group L1 and the third lens group L3 move along the optical axis while maintaining the distance therebetween. The fourth lens group L4 also serves as a focusing lens group. FIG. 1 shows both moving paths of the first through fourth lens groups L1 through L4 during the zooming operation and moving paths for advancing/retracting operation. By definition, a vari-focal lens is one whose focal point slightly varies when varying the focal length, and a zoom lens is one whose focal point does not vary substantially when varying the focal length. However, the vari-focal lens system of the present invention is hereinafter referred to as a zoom lens system.

Figure 8:
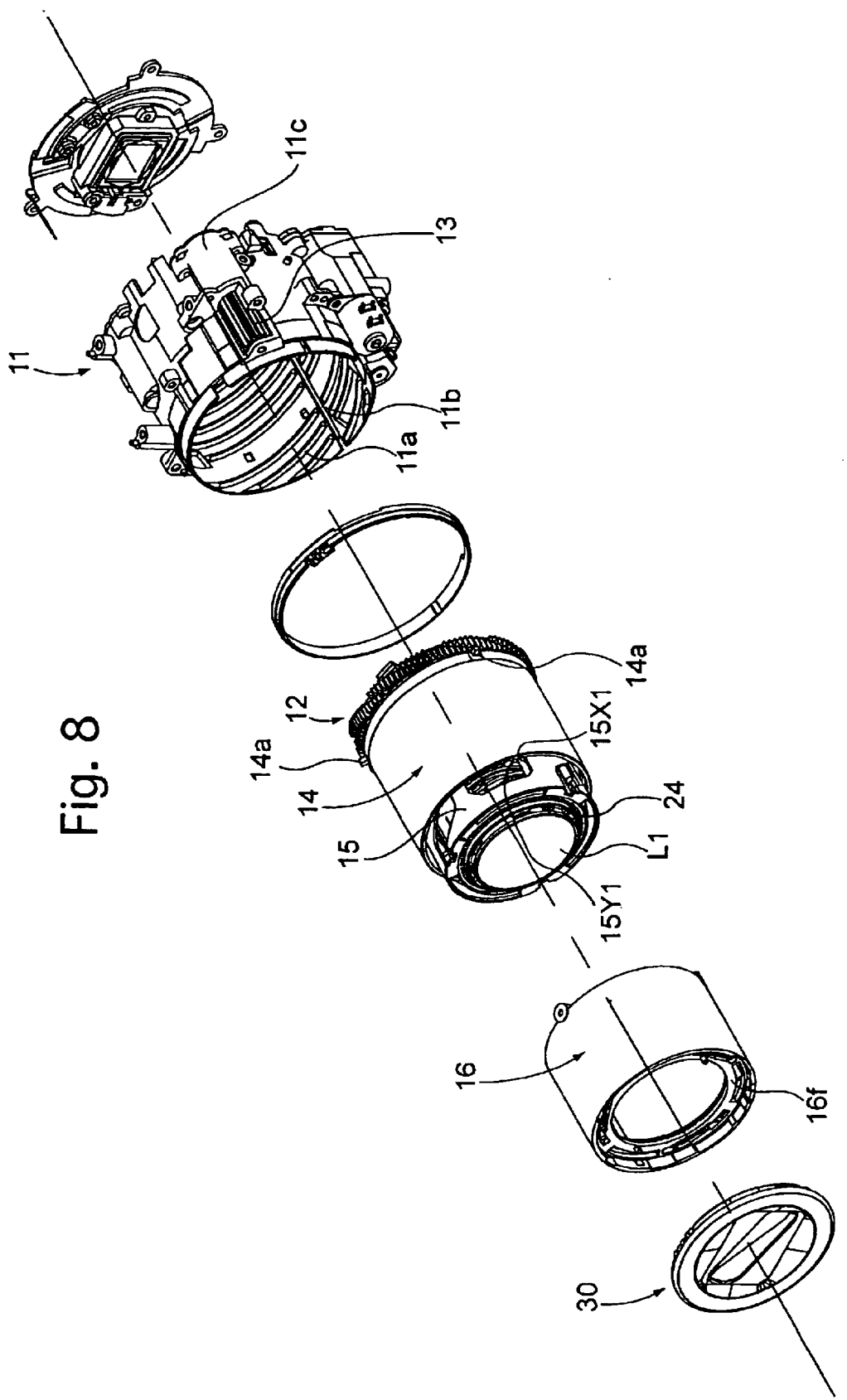
FIG. 8 is an exploded perspective view of a portion of the zoom lens barrel shown in FIG. 3.
Figure 9:
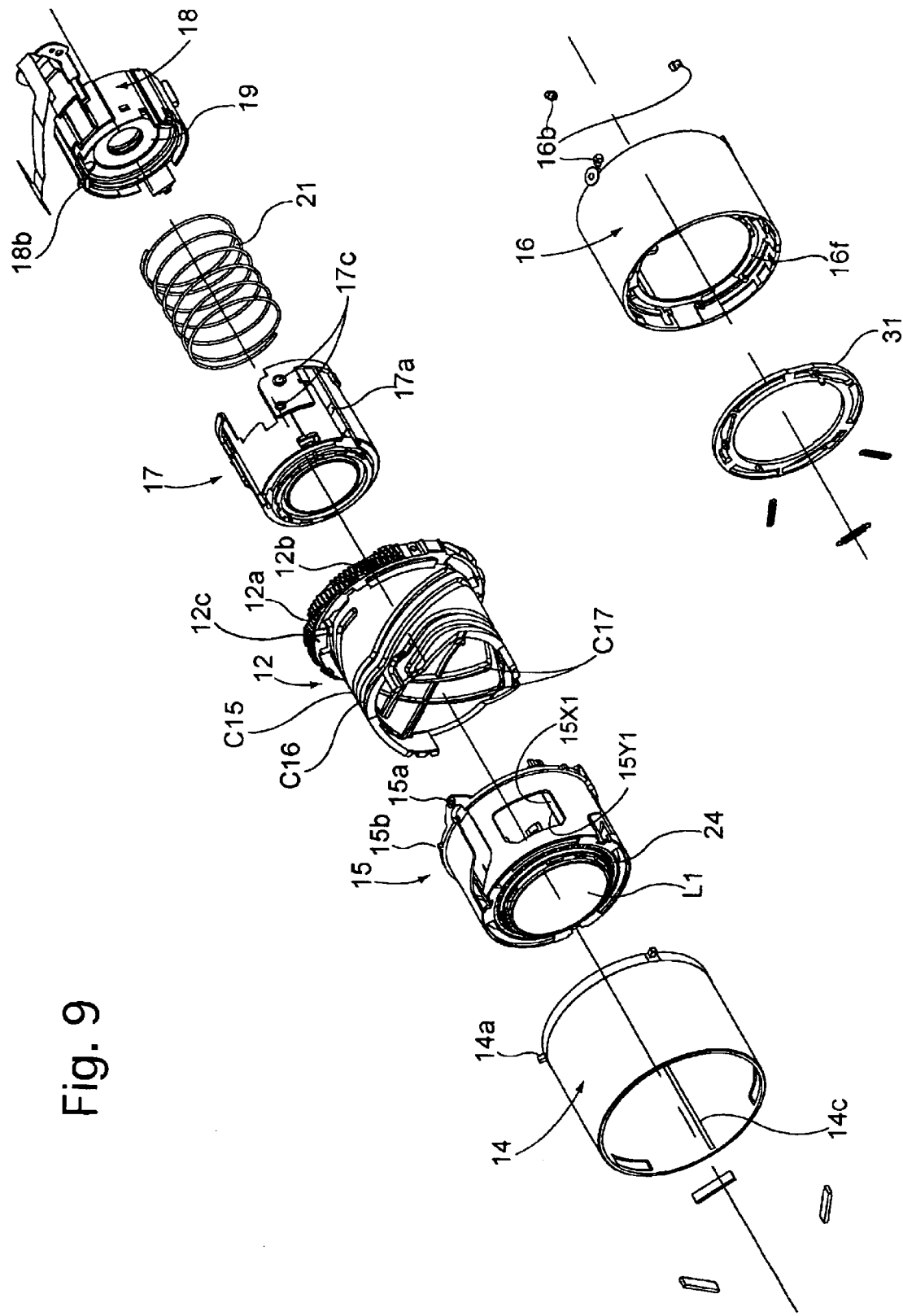
FIG. 9 is an exploded perspective view of a portion of the zoom lens barrel shown in FIG. 3.
Figure 10:
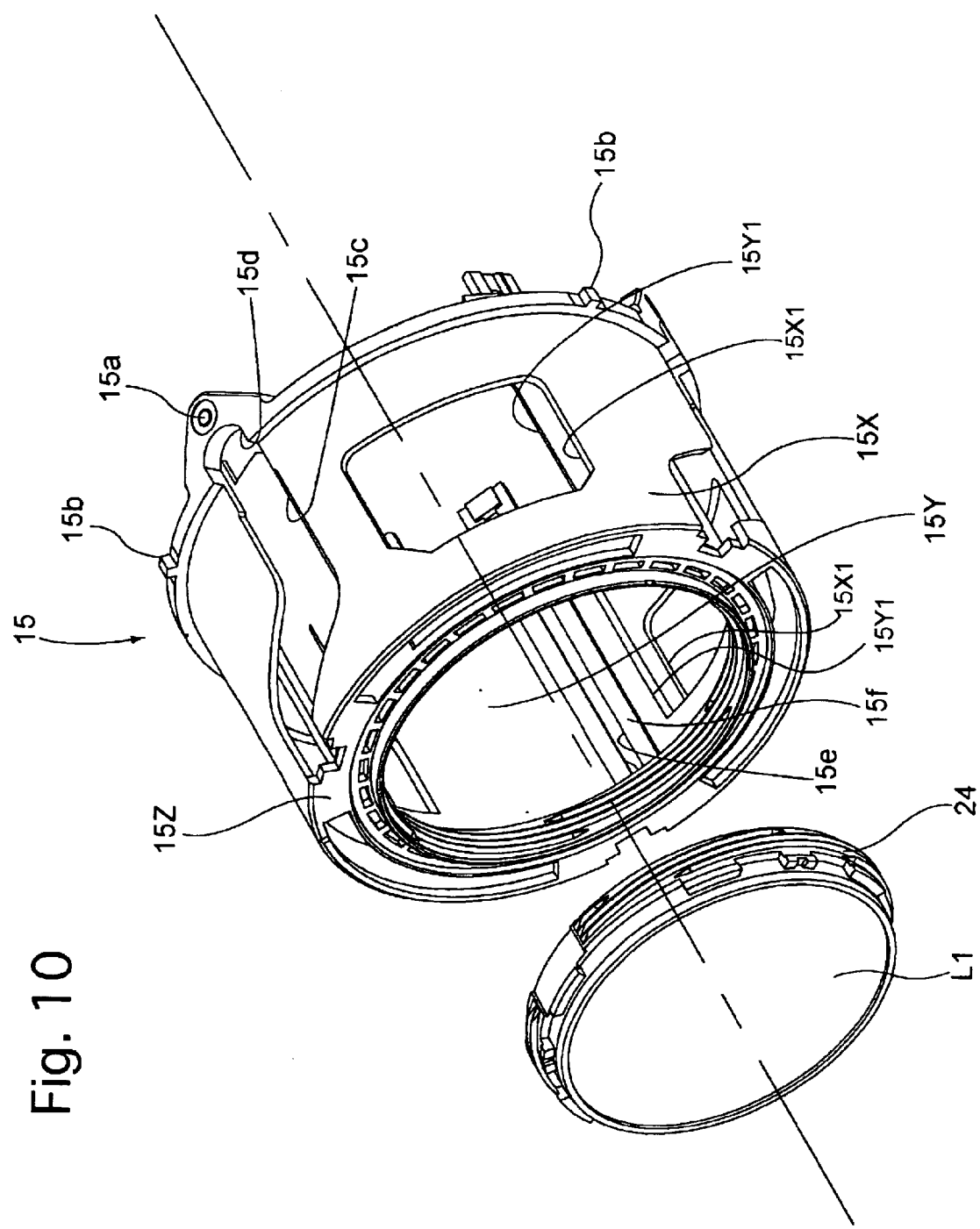
FIG. 10 is an exploded perspective view of a portion of the zoom lens barrel shown in FIG. 3, showing a first lens group moving ring and peripheral elements.
Figure 15:
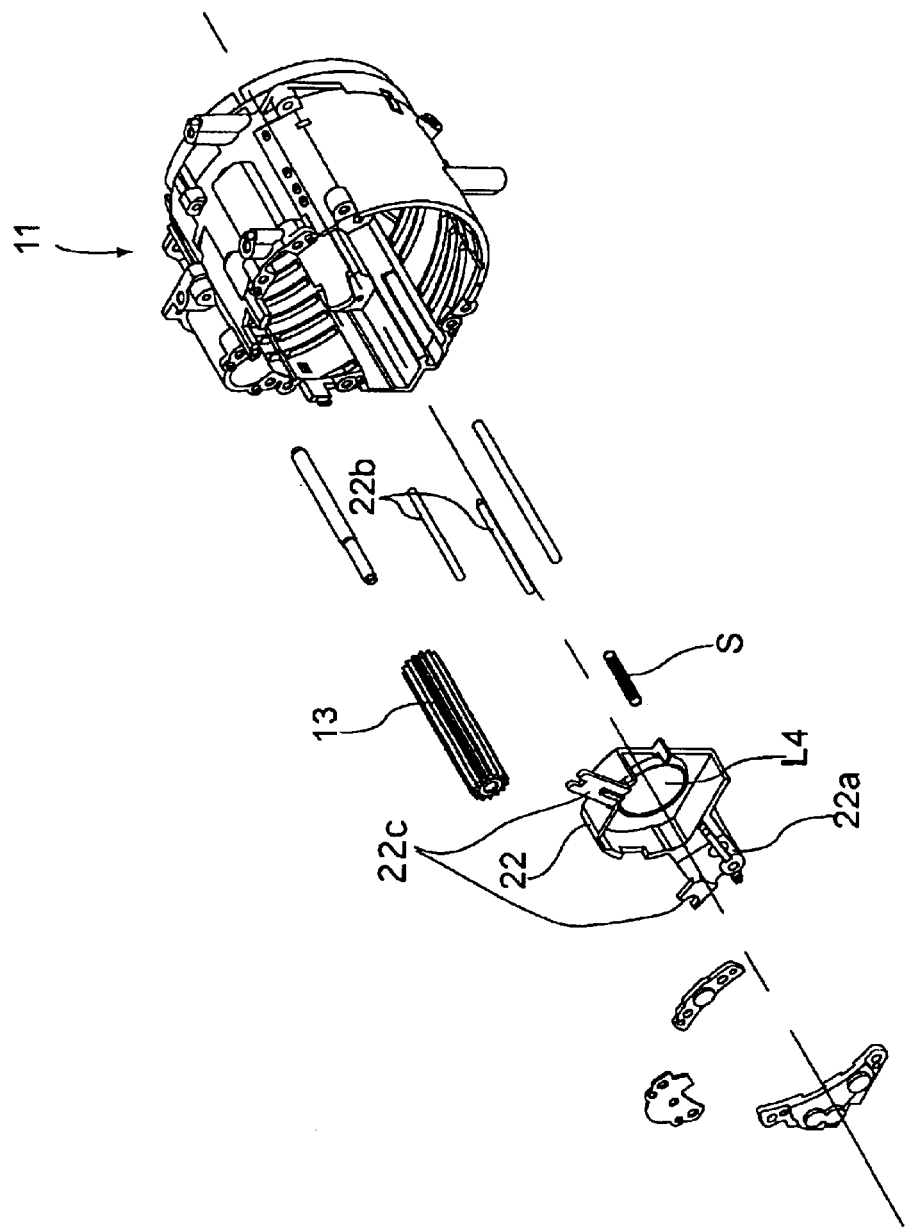
FIG. 15 is an exploded perspective view of a portion of the zoom lens barrel shown in FIG. 3, showing the stationary barrel, a fourth lens group and peripheral elements.

The overall structure of the zoom lens barrel 10 will be hereinafter discussed with reference to FIGS. 1 through 19. The zoom lens barrel 10 is provided with a stationary barrel 11 which is fixed to a camera body (not shown). As shown in FIG. 8, the stationary barrel 11 is provided on an inner peripheral surface thereof with a female helicoid 11a and a set of three linear guide grooves 11b which extend parallel to the optical axis O. The zoom lens barrel 10 is provided inside the stationary barrel 11 with a cam/helicoid ring (cam ring) 12. As shown in FIG. 9, the cam/helicoid ring 12 is provided, on an outer peripheral surface thereof in the vicinity of the rear end of the cam/helicoid ring 12, with a male helicoid 12a which is engaged with the female helicoid 11a of the stationary barrel 11. The cam/helicoid ring 12 is provided on the thread of the male helicoid 12a with a spur gear 12b which is always engaged with a drive pinion 13 (see FIG. 15). The drive pinion 13 is provided in a recessed portion 11c (see FIG. 3) formed on an inner peripheral surface of the stationary barrel 11. The drive pinion 13 is supported by the stationary barrel 11 to be freely rotatable in the recessed portion 11c on an axis of the drive pinion 13. Accordingly, forward and reverse rotations of the drive pinion 13 cause the cam/helicoid ring 12 to move forward rearward along the optical axis O while rotating about the optical axis O due to the engagement of the drive pinion 13 with the spur gear 12b and the engagement of the female helicoid 11a with the male helicoid 12a. In the present embodiment of the zoom lens barrel 10, the cam/helicoid ring 12 is the only element thereof which rotates about the optical axis O.

The zoom lens barrel 10 is provided around the cam/helicoid ring 12 with a linear guide ring 14. The linear guide ring 14 is provided, on an outer peripheral surface thereof at the rear end of the linear guide ring 14, with a set of three linear guide projections 14a which project radially outwards to be engaged in the set of three linear guide grooves 11b of the stationary barrel 11, respectively. The linear guide ring 14 is provided, on an inner peripheral surface thereof at the rear end of the linear guide ring 14, with a set of three bayonet lugs 14b (only one of them appears in FIGS. 1 through 4). The cam/helicoid ring 12 is provided, on an outer peripheral surface thereof immediately in front of the male helicoid 12a (the spur gear 12b), with a circumferential groove 12c in which the set of three bayonet lugs 14b are engaged to be rotatable about the optical axis O in the circumferential groove 12c. Accordingly, the linear guide ring 14 is linearly movable along the optical axis O together with the cam/helicoid ring 12 without rotating about the optical axis O.

Figure 4:
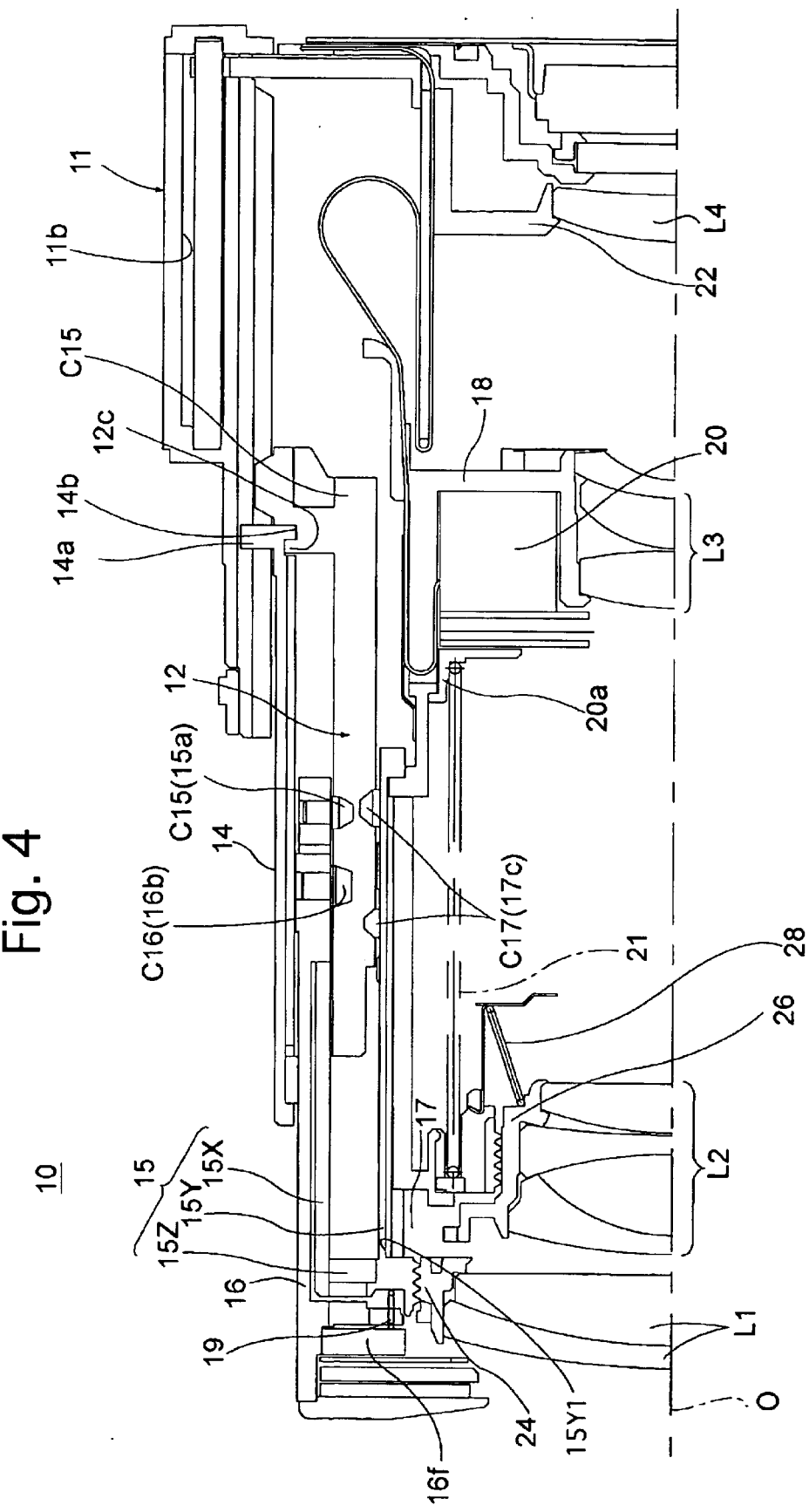
FIG. 4 is a view similar to that of FIG. 3, and shows an upper half of the zoom lens barrel from the optical axis thereof at the wide-angle extremity.
Figure 16:
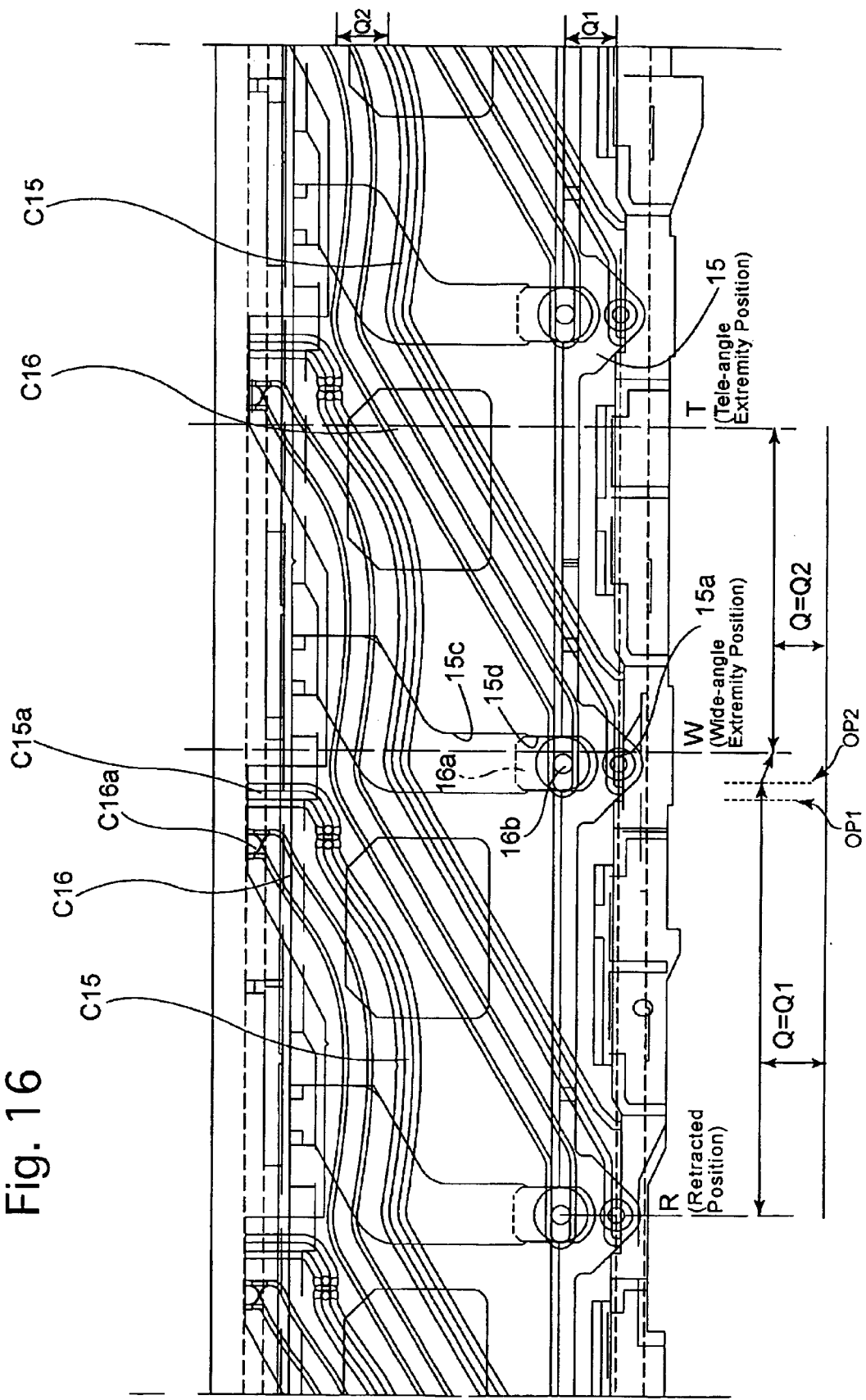
FIG. 16 is a developed view of a cam/helicoid ring, showing a set of first cam grooves of the cam/helicoid ring for moving the first lens group and a set of third cam grooves of the cam/helicoid ring for moving an exterior ring.

The zoom lens barrel 10 is provided around the cam/helicoid ring 12 with a first lens group moving ring (first lens frame) 15 which supports the first lens group L1, and is further provided around the first lens group moving ring 15 with an exterior ring 16 serving as a light shield member (light-shield exterior ring). The zoom lens barrel 10 is provided inside the cam/helicoid ring 12 with a second lens group moving ring (second lens frame) 17 which supports the second lens group L2. As shown in FIGS. 4, 9 and 16, the cam/helicoid ring 12 is provided on an outer peripheral surface thereof with a set of three first cam grooves (first outer cam grooves) C15 for moving the first lens group moving ring 15 and a set of three third cam grooves (second outer cam grooves) C16 for moving the exterior ring 16, and is further provided on an inner peripheral surface of the cam/helicoid ring 12 with a set of six second cam grooves (inner cam grooves) C17 for moving the second lens group moving ring 17 (see FIG. 19). The set of three first cam grooves C15 and the set of three third cam grooves C16 are slightly different in shape, and are apart from one another at predetermined intervals in a circumferential direction of the cam/helicoid ring 12. The set of six second cam grooves C17 have the same basic cam diagrams, and includes three front second cam grooves C17, and three rear second cam grooves C17 which are positioned behind the three front second cam grooves C17 in the optical axis direction (vertical direction as viewed in FIG. 19), respectively; the three front second cam grooves C17 are apart from one another in a circumferential direction of the cam/helicoid ring 12 while the three rear second cam grooves C17 are apart from one another in a circumferential direction of the cam/helicoid ring 12. Each of the first lens group moving ring 15, the exterior ring 16 and the second lens group moving ring 17 is linearly guided along the optical axis O. A rotation of the cam/helicoid ring 12 causes the first lens group moving ring 15, the exterior ring 16 and the second lens group moving ring 17 to move along the optical axis O in accordance with the contours of the set of three first cam grooves C15, the set of three third cam grooves C16 and the set of six second cam grooves C17, respectively.

Figure 5:
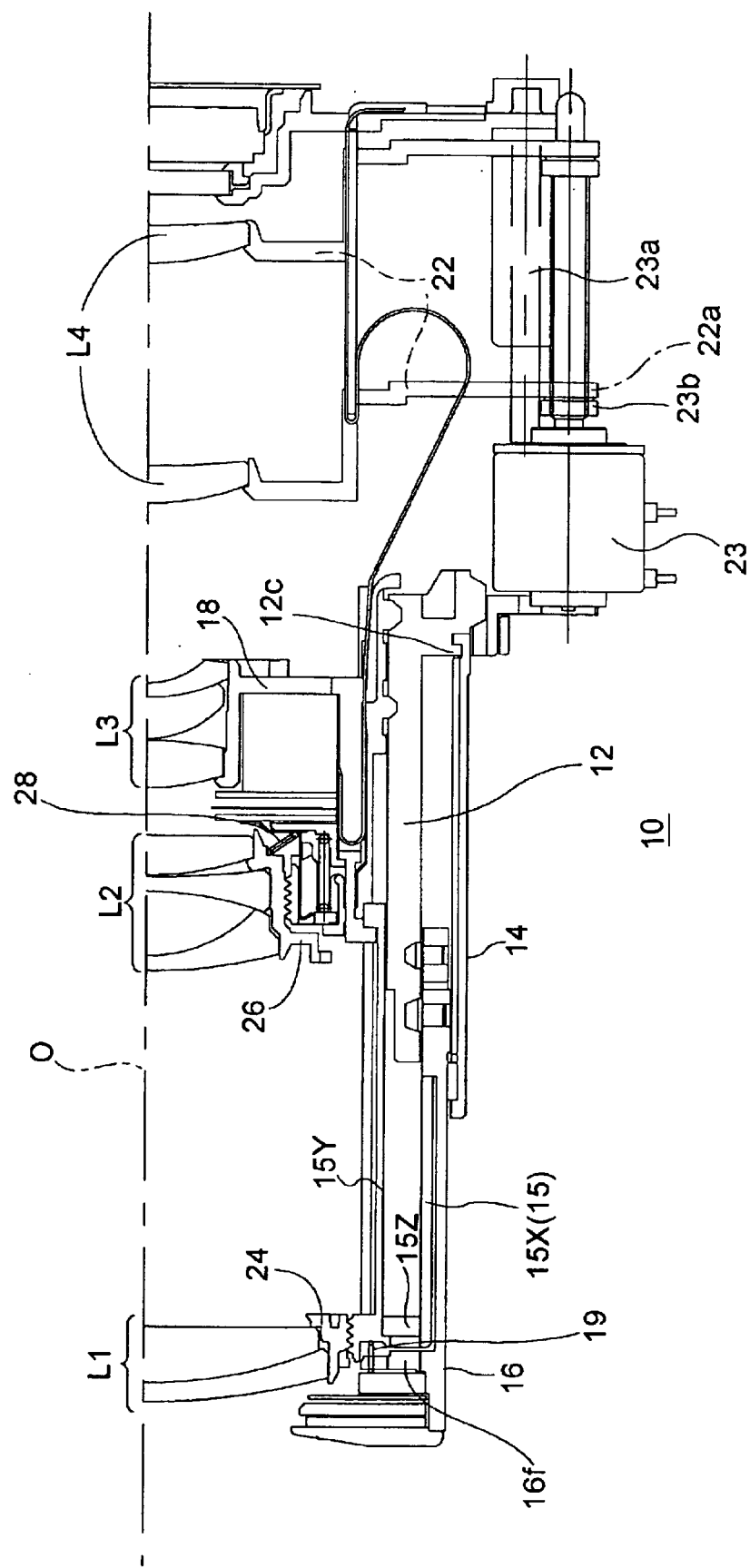
FIG. 5 is a view similar to that of FIG. 3, and shows a lower half of the zoom lens barrel from the optical axis thereof at the telephoto extremity.

Linear guide mechanical linkages among the first lens group moving ring 15, the exterior ring 16 and the second lens group moving ring 17 will be discussed hereinafter. As shown in FIGS. 4 and 5, the first lens group moving ring 15 is provided with an outer ring portion 15X, an inner ring portion 15Y and a flange wall 15Z by which the front end of the outer ring portion 15X and the front end of the inner ring portion 15Y are connected to have a substantially U-shaped cross section. The cam/helicoid ring 12 is positioned between the outer ring portion 15X and the inner ring portion 15Y. Three cam followers 15a which are respectively engaged in the set of three first cam grooves C15 are fixed to the outer ring portion 15X in the vicinity of the rear end thereof. The zoom lens barrel 10 is provided with a first lens group support frame 24 which supports the first lens group L1. As shown in FIGS. 8 and 9, the first lens group support frame 24 is fixed to the inner ring portion 15Y at the front end thereof through a male thread portion and a female thread portion which are formed on an outer peripheral surface of the first lens group support frame 24 and an inner peripheral surface of the inner ring portion 15Y, respectively (see FIG. 10). The first lens group support frame 24 can be rotated relative to the first lens group moving ring 15 to adjust the position of the first lens group support frame 24 along the optical axis O relative to the first lens group moving ring 15 to carry out a zooming adjustment (which is an adjustment operation which is carried out in a manufacturing process of the zoom lens barrel if necessary).

The linear guide ring 14, which is linearly guided along the optical axis O by the stationary barrel 11, is provided, on an inner peripheral surface thereof at approximately equiangular intervals (intervals of approximately 120 degrees), with a set of three linear guide grooves 14c (only one of them appears in FIG. 9), while the outer ring portion 15X of the first lens group moving ring 15 is provided at the rear end thereof with a set of three linear guide projections 15b (see FIG. 10) which project radially outwards to be engaged in the set of three linear guide grooves 14c, respectively. The outer ring portion 15X is provided with a set of three assembly slots 15c (see FIGS. 10 and 16), and is further provided at the rear ends of the set of three assembly slots 15c with a set of linear guide slots 15d which are communicatively connected with the set of three assembly slots 15c and are smaller in width than the set of three assembly slots 15c, respectively. Three linear guide keys 16a which are fixed to the exterior ring 16 which is positioned between the outer ring portion 15X and the linear guide ring 14 are engaged in the set of linear guide slots 15d, respectively. The maximum relative moving distance between the first lens group moving ring 15 and the exterior ring 16 along the optical axis O (the difference in shape between the set of three first cam grooves C15 and the set of three third cam grooves C16) is only a slight distance, and the length of each linear guide slot 15d in the optical axis direction is correspondingly short. A set of three cam followers 16b which are engaged in the set of three third cam grooves C16 are fixed to the set of three linear guide keys 16a, respectively (see FIGS. 7 and 9).

Figure 3:
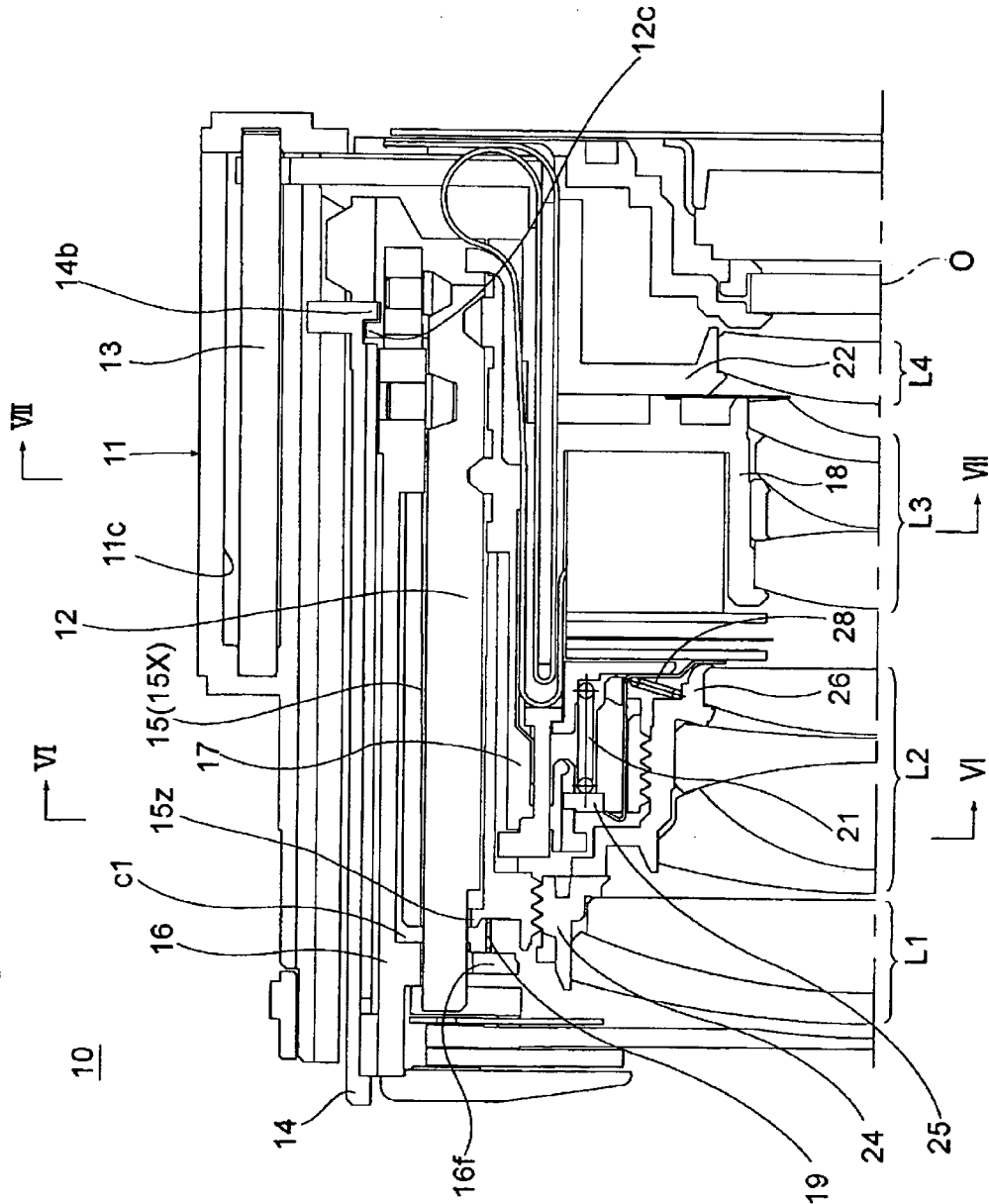
FIG. 3 is a longitudinal cross sectional view of the embodiment of the zoom lens barrel according to the present invention, showing an upper half of the zoom lens barrel from the optical axis thereof in a retracted state.

The zoom lens barrel 10 is provided between the first lens group moving ring 15 and the exterior ring 16 with a compression coil spring 19 (see FIGS. 3 through 5). The compression coil spring 19 biases the first lens group moving ring 15 rearward to remove backlash between the set of three first cam grooves C15 and the set of three cam followers 15a, and at the same time, biases the exterior ring 16 forward to remove backlash between the set of three third cam grooves C16 and the set of three cam followers 16b.

As shown in FIG. 16, the set of three first cam grooves C15 and the set of three third cam grooves C16 are shaped slightly different from each other in their respective retracting positions, as compared with their respective photographing ranges (zooming ranges), so that the exterior ring 16 advances from the photographing position thereof relative to the first lens group moving ring 15 to prevent barrier blades of a lens barrier unit 30 (see FIG. 8) and the first lens group L1 from interfering with each other when the zoom lens barrel 10 is fully retracted as shown in FIG. 3. More specifically, as shown in FIG. 16, the shapes of the first cam grooves C15 and the third cam grooves C16 are determined so that the distance Q in the optical axis direction between the first cam grooves C15 and the third cam grooves C16 in the preparation ranges (i.e., the range between the retracted position and the position at which the lens barrier unit 30 is fully open) is longer than that of the zoom ranges (i.e., the range between the wide-angle extremity and the telephoto extremity). Namely, throughout the entirety of the preparation ranges the distance Q=Q1, however, the distance Q gradually reduces from a position OP2 at a predetermined distance from a fully opened position OP1 of the lens barrier unit 30 (i.e., from a position whereby the first lens group L1 and the lens barrier unit 30 do not interfere with each other), so that the distance Q=Q2 (<Q1) at the wide-angle extremity, and the distance Q=Q2 in the entirety of the zoom ranges.

It can be seen in FIG. 3 that a clearance cl between the flange wall 15Z of the first lens group moving ring 15 and a flange wall 16f of the exterior ring 16 when the zoom lens barrel 10 is in the retracted position is greater than that when the zoom lens barrel 10 is in a ready-to-photograph position as shown in FIG. 4 or 5. In other words, when the zoom lens barrel 10 is in a ready-to-photograph position as shown in FIG. 4 or 5, the flange wall 15Z of the first lens group moving ring 15 and the flange wall 16f of the exterior ring 16 are positioned closely to each other to reduce the length of the zoom lens barrel 10. The lens barrier unit 30 is supported by the exterior ring 16 at the front end thereof. The zoom lens barrel 10 is provided, immediately behind the lens barrier unit 30 (between the lens barrier unit 30 and the flange wall 16f of the exterior ring 16), with a barrier opening/closing ring 31 (see FIG. 9). Rotating the barrier opening/closing ring 31 at the retracted position via rotation of the cam/helicoid ring 12 causes the barrier blades of the lens barrier unit 30 to open and shut. The mechanism for opening and closing the barrier blades using a barrier opening/closing ring such as the barrier opening/closing ring 31 is known in the art.

Note that in the illustrated embodiment, although the shapes of the first cam grooves C15 and the third cam grooves C16 are determined so that the distance Q (i.e., Q2) is constant (unchanging) over the entire zoom range, the distance Q (i.e., Q2) can be determined so as to change in accordance with the focal length. Furthermore, the distance Q2 over the zoom range can be determined so as to be greater than the distance Q1 over the preparation range.

The front end of each third cam groove C16 is open on a front end surface of the cam/helicoid ring 12 to be formed as an open end C16a (see FIG. 16) through which the associated cam follower 16b of the exterior ring 16 is inserted into the third cam groove C16. Likewise, the front end of each first cam groove C15 is open on a front end surface of the cam/helicoid ring 12 to be formed as an open end C15a (see FIG. 16) through which the associated cam follower 15a of the first lens group moving ring 15 is inserted into the first cam groove C15.

Figure 6:
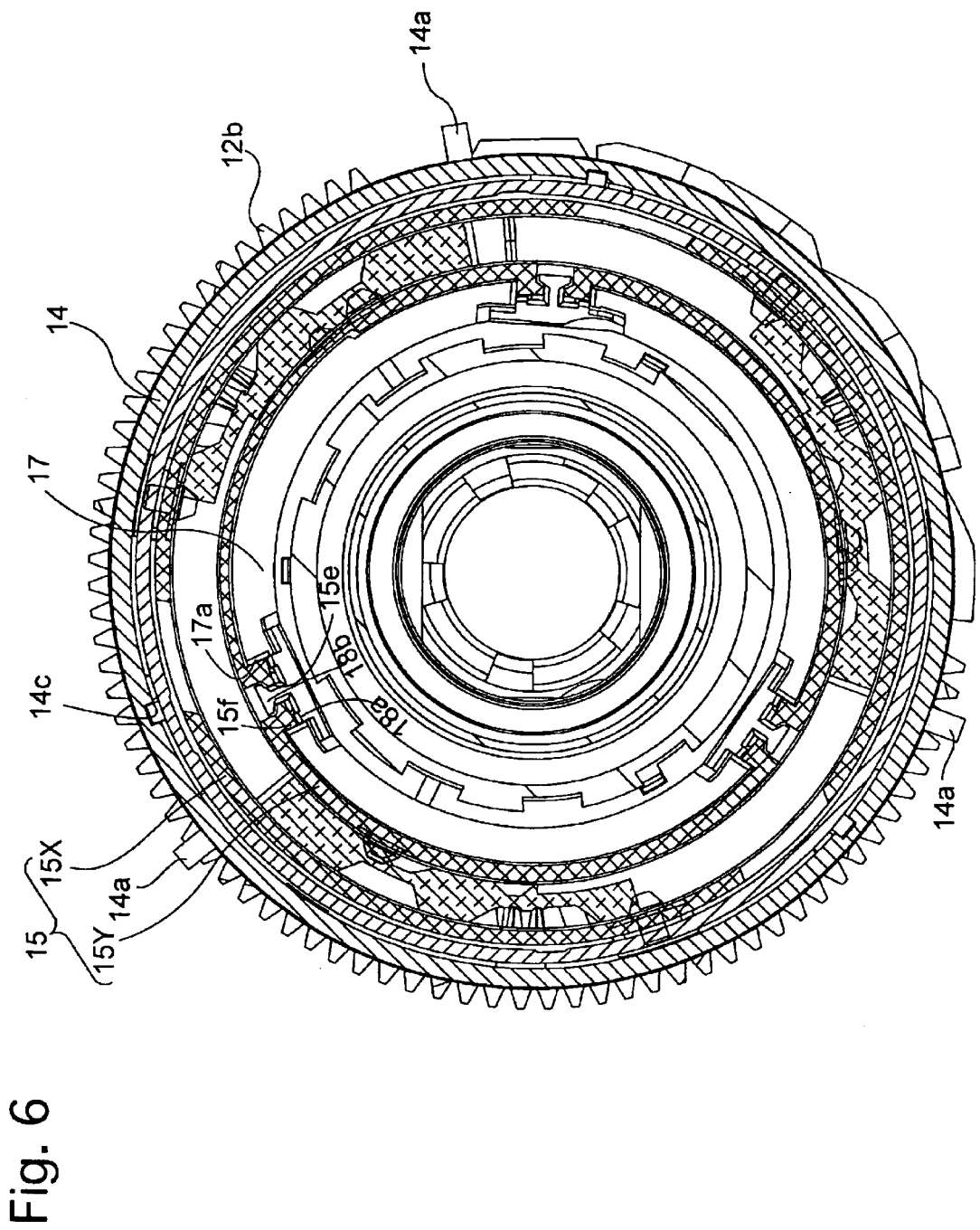
FIG. 6 is a transverse cross sectional view taken along VI—VI line shown in FIG. 3.
Figure 7:
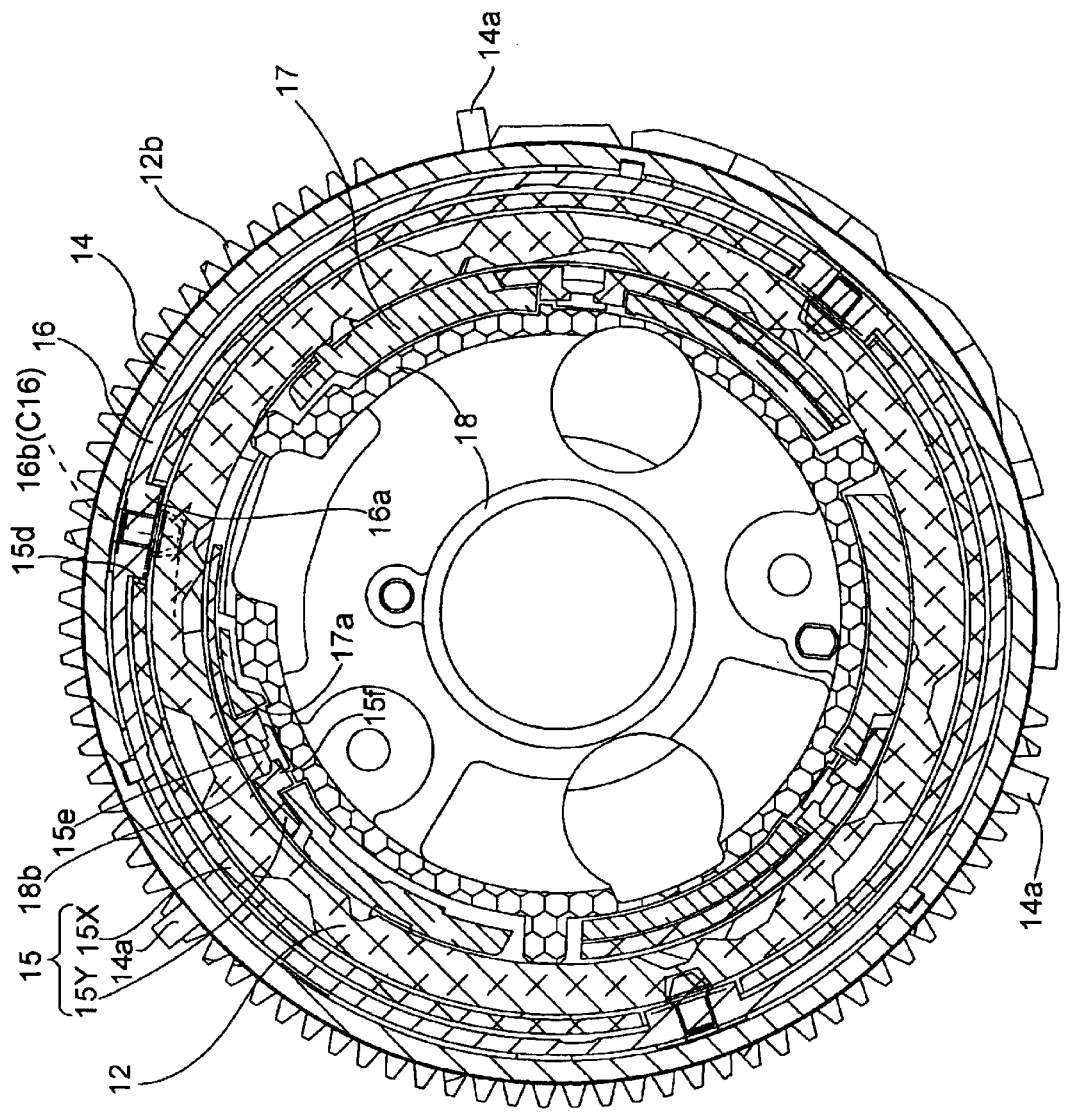
FIG. 7 is a transverse cross sectional view taken along VII—VII line shown in FIG. 3.
Figure 17:
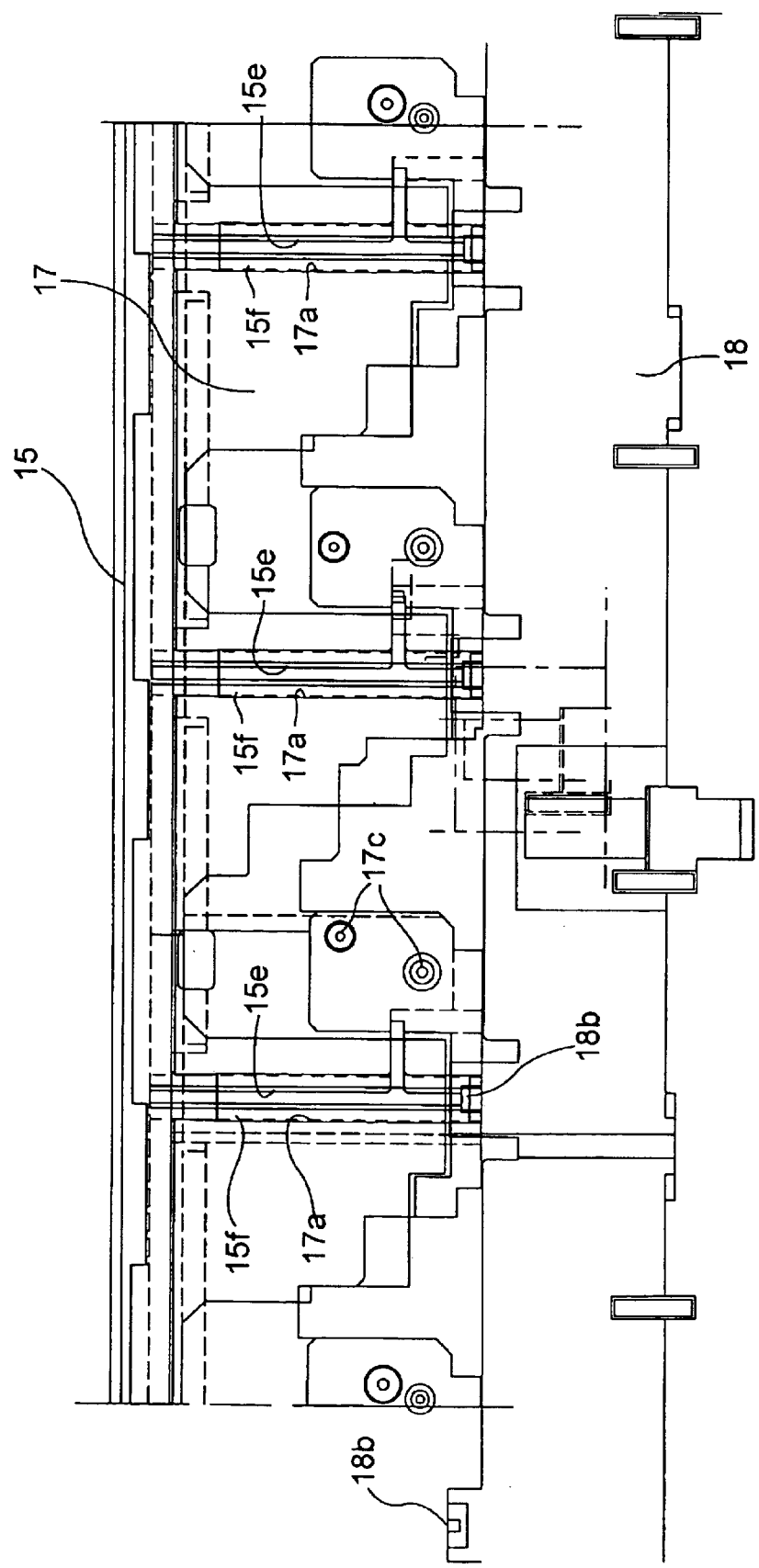
FIG. 17 is a developed view of the first lens group moving ring, the second lens group moving ring and the third lens group moving ring, showing linear guide mechanical linkages among the first through third lens group moving rings.
Figure 18:
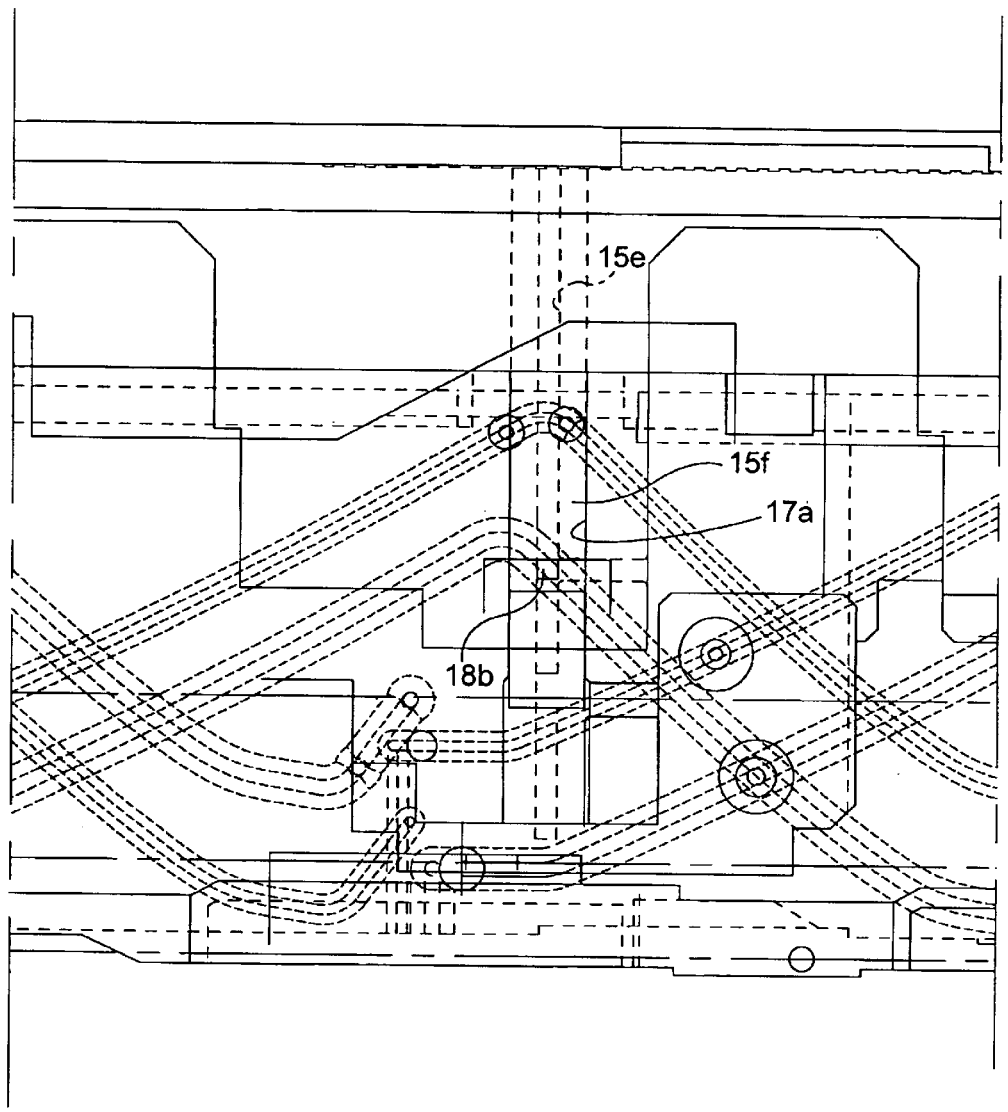
FIG. 18 is an enlarged view of a portion of the developed view shown in FIG. 17.
Figure 19:
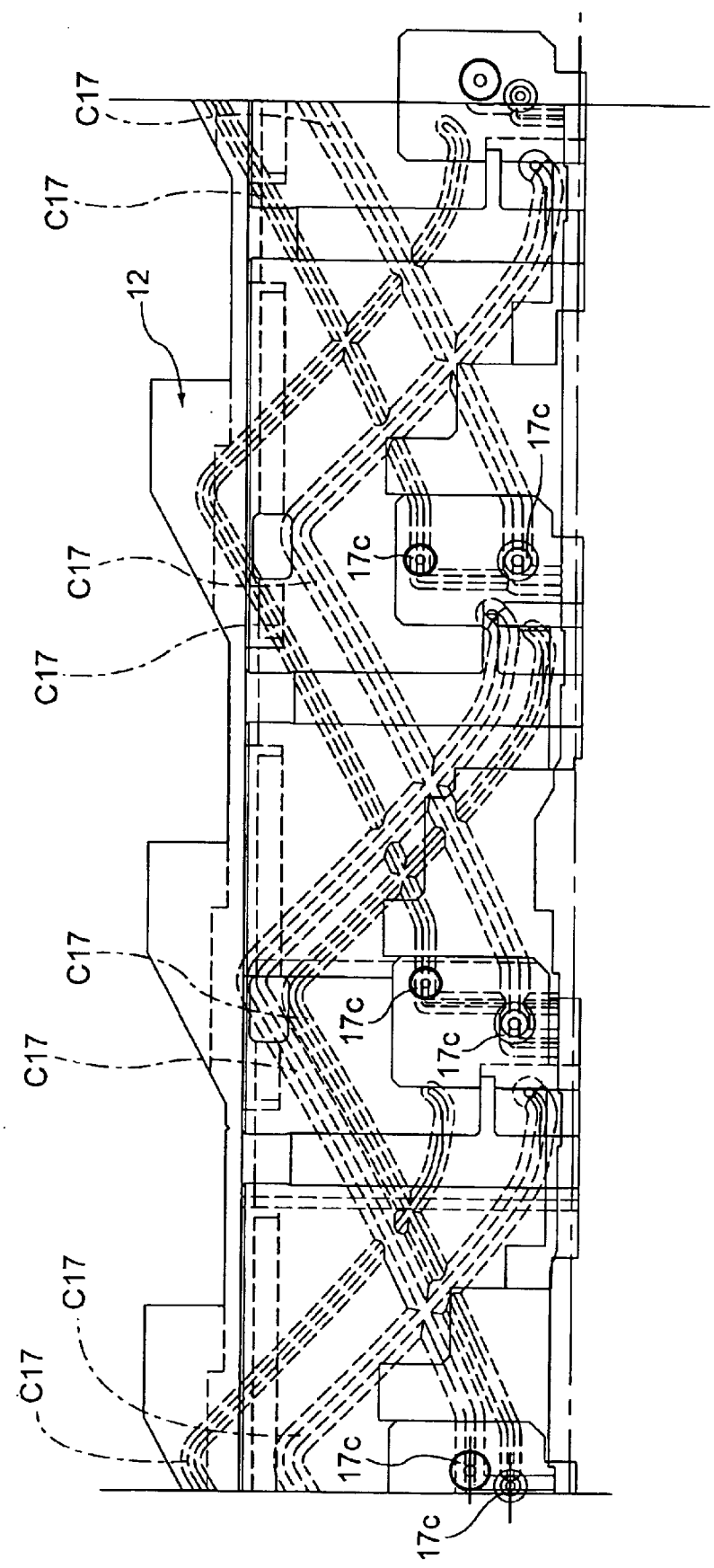
FIG. 19 is a developed view of the cam/helicoid ring, showing the shapes of a set of second cam grooves of the cam/helicoid ring for moving the second lens group.

The inner ring portion 15Y of the first lens group moving ring 15 is provided on an inner peripheral surface thereof with a set of three linear guide projections 15f which are elongated in a direction parallel to the optical axis O, while the second lens group moving ring 17 is provided with a set of three linear guide slots (linear guide through-slots) 17a which are elongated in a direction parallel to the optical axis O to be engaged with the set of three linear guide projections 15f to be freely slidable relative thereto along the optical axis O (see FIGS. 6, 7 and 17). Each linear guide projection 15f is provided along a substantially center thereof with a hanging groove 15e which is elongated in a direction parallel to the optical axis O and which has a substantially T-shaped cross section as shown in FIG. 6. The three linear guide projections 15f and the three linear guide slots 17a constitute a first linear guide mechanism. The rear end of each hanging groove 15e is closed (see FIGS. 17 and 18). The second lens group moving ring 17 is provided on an outer peripheral surface thereof with six cam followers 17c which are engaged in the set of six second cam grooves C17 of the cam/helicoid ring 12, respectively.

Figure 11:
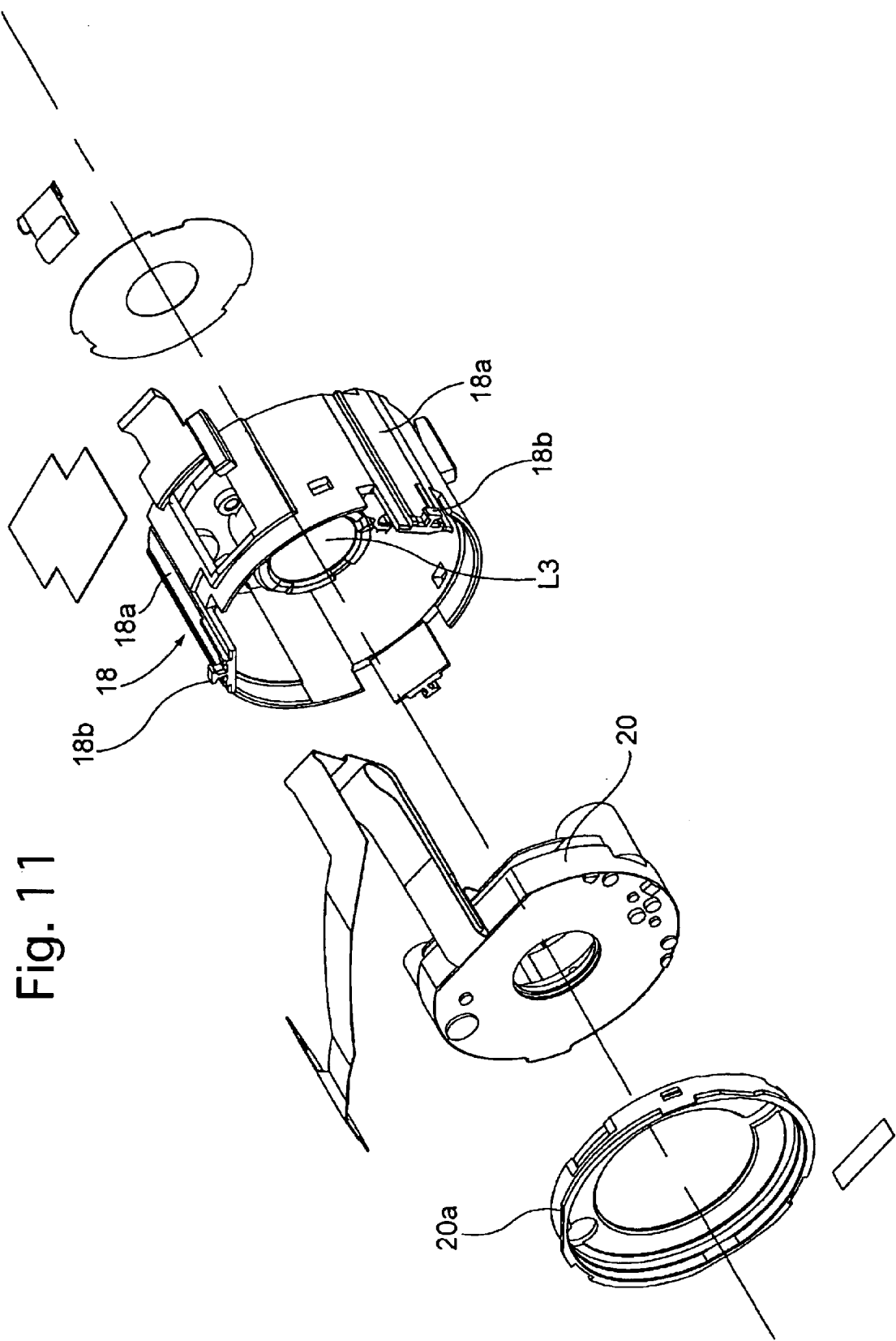
FIG. 11 is an exploded perspective view of a portion of the zoom lens barrel shown in FIG. 3, showing a third lens group moving ring and peripheral elements.

The zoom lens barrel 10 is provided inside the second lens group moving ring 17 with a third lens group moving ring (third lens frame) 18 which supports the third lens group L3. The third lens group moving ring 18 is provided on an outer peripheral surface thereof with a set of three linear guide projections 18a which are elongated in a direction parallel to the optical axis O to be engaged in the set of three linear guide slots 17a of the second lens group moving ring 17 to be freely slidable relative thereto along the optical axis O, respectively. The third lens group moving ring 18 is provided on a center of each linear guide projection 18a at the front end thereof with a linear moving key (stop projection) 18b (see FIGS. 11, 17 and 18) which has a substantially T-shaped cross section to be engaged in the associated hanging groove 15e. The three linear guide projections 15f, the three hanging groove 15e and the three linear moving keys 18b constitute a second linear guide mechanism. Furthermore, the three linear guide slots 17a and the three linear guide projections 18a constitute a third linear guide mechanism. As shown in FIG. 11, the zoom lens barrel 10 is provided with a shutter unit 20 which is inserted into the third lens group moving ring 18 to be positioned in front of the third lens group L3. The shutter unit 20 is fixed to the third lens group moving ring 18 by a fixing ring 20a. The zoom lens barrel 10 is provided between the third lens group moving ring 18 (the fixing ring 20a) and the second lens group moving ring 17 with a compression coil spring 21 which continuously biases the third lens group moving ring 18 rearwards relative to the second lens group moving ring 17. The rear limit of this rearward movement of the third lens group moving ring 18 relative to the second lens group moving ring 17 is determined by the three linear moving keys 18b contacting the closed rear ends of the three hanging grooves 15e, respectively. Namely, when the zoom lens barrel 10 is in a ready-to-photograph position, each linear moving key 18b remains in contact with the rear end of the associated hanging groove 15e of the first lens group moving ring 15 to keep the distance between the first lens group L1 and the third lens group L3 constant. When the zoom lens barrel 10 changes from a ready-to-photograph state to the retracted state shown in FIG. 3, a further rearward movement of the first lens group L1 in accordance with contours of the set of three first cam grooves C15, after the third lens group L3 (the third lens group moving ring 18) has reached the mechanical rear moving limit thereof, causes the first lens group L1 to approach the third lens group L3 while compressing the compression coil spring 21 (see FIG. 1). Each linear moving key 18b is formed so that the radially outer end thereof bulges to be prevented from coming off the associated hanging groove 15e.

Figure 12:
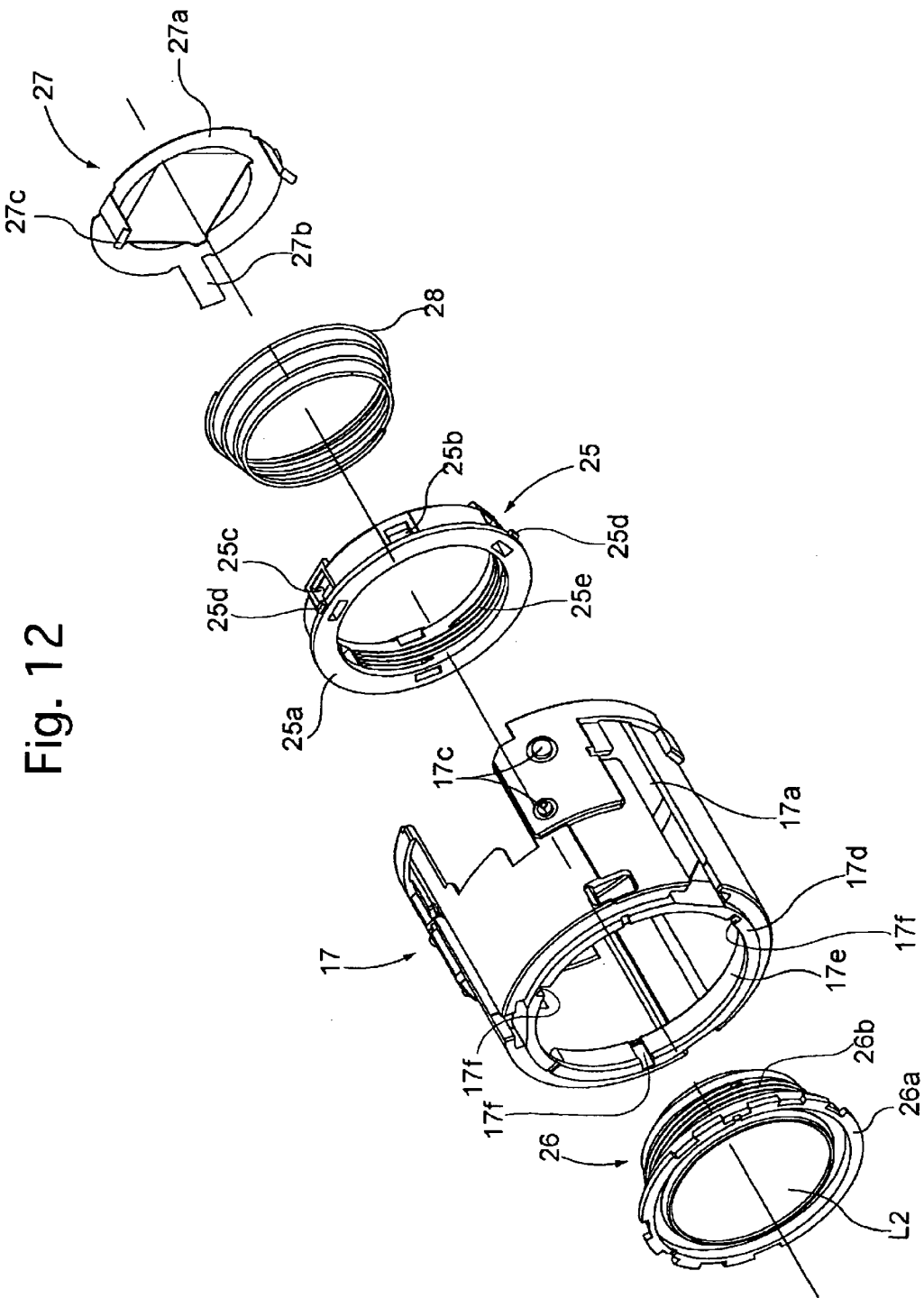
FIG. 12 is an exploded perspective view of a portion of the zoom lens barrel shown in FIG. 3, showing a second lens group moving ring and peripheral elements.
Figure 13:
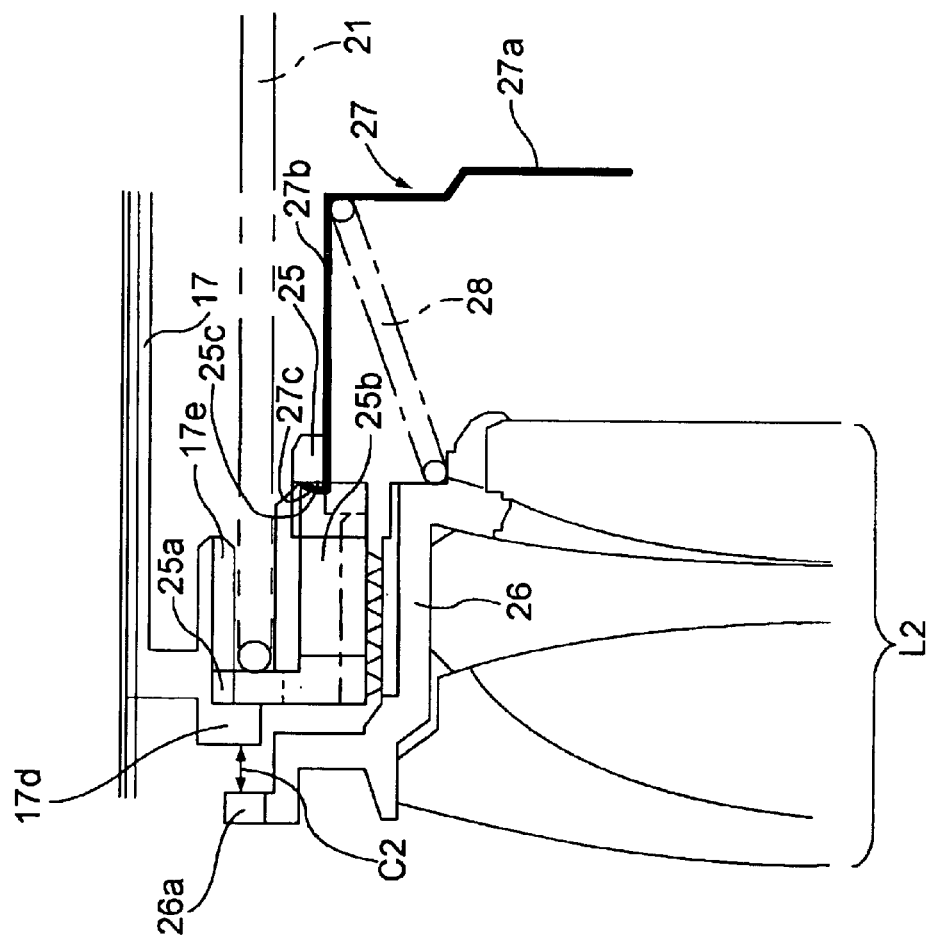
FIG. 13 is a longitudinal view of a portion of the zoom lens barrel shown in FIG. 3, showing a portion of the second lens group moving ring and peripheral elements.
Figure 14:
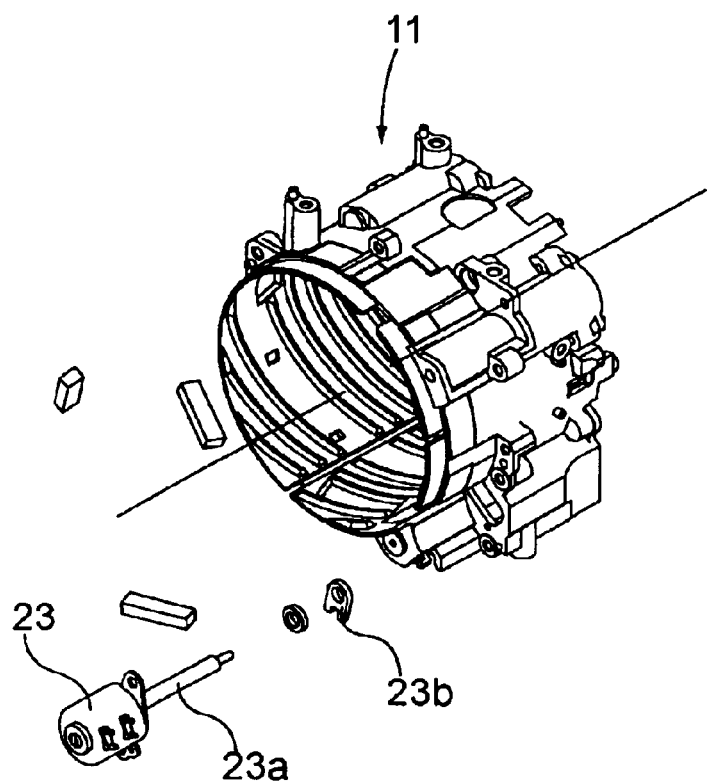
FIG. 14 is an exploded perspective view of a portion of the zoom lens barrel shown in FIG. 3, showing a stationary barrel, a pulse motor supported by the stationary barrel, and peripheral elements, seen from the rear side thereof.

Although a biasing force of the compression coil spring 21 can be applied directly to the second lens group moving ring 17 (i.e., although the second lens group L2 can be fixed to the second lens group moving ring 17), the second lens group L2 is made to be capable of moving rearward relative to the second lens group moving ring 17 for the purpose of further reduction in length of the zoom lens barrel 10 in the retracted state thereof in the present embodiment of the zoom lens barrel. FIGS. 12 and 13 show this structure for the further reduction in length of the zoom lens barrel 10. The second lens group moving ring 17 is provided at the front end thereof with a cylindrical portion 17e having an inner flange 17d. Three linear guide grooves 17f, which extend parallel to the optical axis direction and open at the front and rear ends thereof, are formed at equi-angular intervals on the cylindrical portion 17e. The zoom lens barrel 10 is provided inside the second lens group moving ring 17 with an intermediate ring 25. The intermediate ring 25 is provided at the front end thereof with a flange portion 25a which is fitted in the cylindrical portion 17e to be freely slidable on the cylindrical portion 17e in the optical axis direction. Three guide projections 25d which radially extend outwards are provided on the outer peripheral surface of the flange-portion 25a. The three guide projection 25d are respectively engaged with the three linear guide grooves 17f of the second lens group moving ring 17 from the rear side of the second lens group moving ring 17. Accordingly, the intermediate ring 25 is prevented from rotating about the optical axis with respect to the second lens group moving ring 17, and can only relatively move in the optical axis direction. The front face of the flange portion 25a can move forwards until sliding contact is made with the rear face of the inner flange 17d. The zoom lens barrel L2 is provided inside the second lens group moving ring 17 with a second lens group support frame 26 to which the second lens group L2 is fixed. A male thread 26b of the second lens group support frame 26 is screwed into female thread 25e formed on the inner periphery of the intermediate ring 25.

Accordingly, the position of the second lens group L2 relative to the intermediate ring 25 which is prevented from rotating about the optical axis can be adjusted in the optical axis direction (zooming adjustment) by rotating the second lens group support frame 26 relative to the intermediate ring 25. After this adjustment, the second lens group support frame 26 can be permanently fixed to the intermediate ring 25 by putting drops of an adhesive agent into a radial through hole 25b formed on the intermediate ring 25. The second lens group support frame 26 is provided on an outer peripheral surface thereof with an outer flange 26a, and a clearance C2 (see FIG. 13) for the zooming adjustment exits between a front end surface of the inner flange 17d and the outer flange 26a. The compression coil spring 21 biases the intermediate ring 25 forward, and the intermediate ring 25 is held at a position where the flange portion 25a contacts with the inner flange 17d when the zoom lens barrel 10 is in a ready-to-photograph state. Namely, on the one hand, the position of the second lens group L2 is controlled by the set of six second cam grooves C17 when the zoom lens barrel 10 is in a ready-to-photograph state; on the other hand, the second lens group support frame 26 is pushed rearward mechanically by the rear end of the first lens group support frame 24 to thereby move the outer flange 26a of the second lens group support frame 26 rearward to a point where the outer flange 26a contacts with the inner flange 17d when the zoom lens barrel 10 is retracted to the retracted position thereof. This reduces the length of the zoom lens barrel 10 by a length corresponding to the clearance C2.

The zoom lens barrel 10 is provided immediately behind the intermediate ring 25 with a light shield ring 27 which is supported by the intermediate ring 25. As shown in FIG. 12, the light shield ring 27 is provided with a ring portion 27a and a set of three leg portions 27b which extend forward from the ring portion 27a at intervals of approximately 120 degrees. Each leg portion 27b is provided at the front end thereof with a hook portion 27c which is formed by bending the tip of the leg portion 27b radially outwards. The intermediate ring 25 is provided on an outer peripheral surface thereof with a set of three engaging holes 25c with which the hook portions 27c of the set of three leg portions 27b are engaged, respectively (see FIG. 12). The zoom lens barrel 10 is provided between the light shield ring 27 and the second lens group support frame 26 with a compression coil spring 28 having a substantially truncated conical shape which continuously biases the light shield ring 27 rearwards. When the zoom lens barrel 10 is retracted toward the retracted position, the light shield ring 27 approaches the second lens group support frame 26 while compressing the compression coil spring 28 after reaching the rear moving limit of the light shield ring 27. The lengths of the set of three engaging holes 25c in the optical axis direction are determined to allow the ring portion 27a to come into contact with the second lens group support frame 26.

The compression coil spring 28 also serves as a device for removing backlash between the intermediate ring 25 and the second lens group support frame 26 when the second lens group support frame 26 is rotated relative to the intermediate ring 25 for the aforementioned zooming adjustment. The zooming adjustment is performed by rotating the second lens group support frame 26 relative to the intermediate ring 25 to adjust the position of the second lens group L2 in the optical axis direction relative to the intermediate ring 25 while viewing the position of an object image. This zooming adjustment can be performed with precision with backlash between the intermediate ring 25 and the second lens group support frame 26 being removed by the compression coil spring 28.

The zoom lens barrel 10 is provided behind the third lens group moving ring 18 with a fourth lens group support frame 22 to which the fourth lens group L4 is fixed. As described above, the fourth lens group L4 is moved to make a slight focus adjustment to the vari-focal lens system to adjust a slight focal deviation thereof while the first through third lens groups L1, L2 and L3 are moved relative to one another to vary the focal length of the zoom lens system, and is also moved as a focusing lens group. The fourth lens group L4 is moved along the optical axis O by rotation of a pulse motor 23 (see FIGS. 5 and 14). The pulse motor 23 is provided with a rotary screw shaft 23a. A nut member 23b is screwed on the rotary screw shaft 23a to be prevented from rotating relative to the stationary barrel 11. The nut member 23b is continuously biased by an extension coil spring S in a direction to contact with a leg portion 22a which projects radially outwards from the fourth lens group support frame 22 (see FIGS. 5 and 15). The fourth lens group support frame 22 is prevented from rotating by guide bars 22b, which extend in direction parallel to the optical axis direction, which are slidably engaged with radial projecting followers 22c which extend radially outwards from the fourth lens group support frame 22 (see FIGS. 2 and 15). Accordingly, rotations of the pulse motor 23 forward and reverse cause the fourth lens group support frame 22 (the fourth lens group L4) to move forward and rearward along the optical axis O, respectively. Rotations of the pulse motor 23 are controlled in accordance with information on focal length and/or information on object distance.

Accordingly, in the above described embodiment of the zoom lens barrel, rotating the cam/helicoid ring 12 by rotation of the drive pinion 13 causes the first lens group moving ring 15, the exterior ring 16 and the second lens group moving ring 17 to move along the optical axis O in accordance with contours of the set of three first cam grooves C15, the set of three third cam grooves C16 and the set of six second cam grooves C17, respectively. When the first lens group moving ring 15 moves forward from the retracted position, firstly the three linear moving keys 18b contact the rear ends of the three hanging grooves 15e, respectively, and subsequently the third lens group moving ring 18 moves together with the first lens group moving ring 15 with the three linear moving key 18b remaining in contact with the rear ends of the three hanging grooves 15e, respectively. The position of the fourth lens group L4 is controlled by the pulse motor 23, whose rotations are controlled in accordance with information on focal length, to make a slight focus adjustment to the vari-focal lens system to adjust a slight focal deviation thereof. As a result, reference moving paths as shown in FIG. 1 for performing a zooming operation are obtained. Rotations of the pulse motor 23 are also controlled in accordance with information on object distance to perform a focusing operation.

As described above, in the present embodiment of the zoom lens barrel 10, the first lens group moving ring (first lens frame) 15, which supports the first lens group L1, and the exterior ring (light-shield exterior ring) 16 are positioned around the cam/helicoid ring (cam ring) 12 which is driven to rotate by rotation of the drive pinion 13. The first lens group moving ring 15 includes the outer ring portion 15X, which is positioned around the cam/helicoid ring 12, the inner ring portion 15Y, which is positioned inside the cam/helicoid ring 12, and the flange wall 15Z, by which the front end of the outer ring portion 15X and the front end of the inner ring portion 15Y are connected. The compression coil spring (biasing device) 19 is positioned in a compressed fashion between the first lens group moving ring 15 and the exterior ring 16. The three followers 15a of the first lens group moving ring 15 are respectively engaged in the set of three first cam grooves (first outer cam grooves) C15 that are formed on an outer peripheral surface of the cam/helicoid ring 12, and the first lens group moving ring 15 is linearly guided along the optical axis O by the linear guide ring 14. The set of three linear guide keys 16a of the exterior ring 16 are respectively engaged in the set of three linear guide slots 15d of the first lens group moving ring 15, the set of three cam followers 16b of the exterior ring 16 are respectively engaged in the set of three third cam grooves (second outer cam grooves) C16 that are formed on an outer peripheral surface of the exterior ring 16, and the exterior ring 16 is linearly guided along the optical axis O by the first lens group moving ring 15. Since the set of three first cam grooves C15 and the set of three third cam grooves C16 have the same shape and size in their respective photographing ranges (i.e., their respective zooming ranges between wide angle extremity and telephoto extremity) as shown in FIG. 16, the exterior ring 16 moves in accordance with the same moving path as the first lens group moving ring 15 along the optical axis O to protect the first lens group moving ring 15 while reinforcing the strength of the first lens group moving ring 15. Moreover, it is sufficient to provide the first lens group moving ring 15 with only the set of linear guide slots 15d, each of which has a relative short length, as a mechanism for guiding the exterior ring 16 linearly along the optical axis O. This makes a further reduction in length of the zoom lens barrel 10 possible.

The set of three first cam grooves C15 and the set of three third cam grooves C16 have different shapes in their respective retracting ranges so that the exterior ring 16 advances from the photographing position thereof relative to the first lens group moving ring 15 to prevent the barrier blades of the lens barrier unit 30 from interfering with the first lens group L1.

Additionally, a set of three outer openings 15X1 for the zooming adjustment and a set of three inner openings 15Y1 for the zooming adjustment which are aligned in radial directions of the zoom lens barrel 10 are formed on the outer ring portion 15X and the inner ring portion 15Y, respectively (see FIGS. 4, 8, 10 and 16). Before the exterior ring 16 is mounted to the cam/helicoid ring 12 (before an outer peripheral surface of the first lens group moving ring 15 is covered with the exterior ring 16), it is possible to carry out the aforementioned zooming adjustment (for adjusting the position of the second lens group L2 relative to the intermediate ring 25 along the optical axis O) by firstly moving the first lens group moving ring 15 and the second lens group moving ring 17 to their respective wide-angle extremity positions (the positions shown in FIG. 4), and subsequently rotating the second lens group support frame 26 relative to the intermediate ring 25 with a special jig (not shown) which can be engaged with the second lens group support frame 26 from the outside of the first lens group moving ring 15 through the set of three outer opening three outer openings 15X1 and the set of three inner openings 15Y1. After this zooming adjustment is completed, the second lens group support frame 26 can be permanently fixed to the intermediate ring 25 by putting drops of an adhesive agent into the radial through hole 25b of the intermediate ring 25.

As described above, the exterior ring 16 of the present embodiment of the zoom lens barrel 10 not only shields the set of three outer openings 15X1 and the set of three inner openings 15Y1 of the first lens group moving ring 15 in a light-tight fashion but also removes backlash of the first lens group moving ring 15 (backlash between the set of three first cam grooves C15 and the set of three followers 15c), supports the lens barrier unit 30, and prevents the barrier blades of the lens barrier unit 30 and the first lens group L1 from interfering with each other by advancing the exterior ring 16 from the photographing position thereof relative to the first lens group moving ring 15 when the zoom lens barrel 10 is retracted to the retracted position. Accordingly, the exterior ring 16 is multi-functional.

The above described structure of the zoom lens barrel which makes the exterior ring 16 multi-functional can be applied to any zoom lens barrel including a cam ring and a lens support ring, regardless of whether the cam ring includes a helicoid such as the male helicoid 12a of the cam/helicoid ring 12.

As can be understood from the foregoing, according to the present invention, a light-shield exterior ring, which formerly serves only as a light shield member, can be made to serve as a multi-functional member.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A zoom lens barrel comprising:
   a cam ring which is driven to rotate;
   a first lens frame which is positioned around said cam ring to be guided linearly along an optical axis, said first lens frame supporting a frontmost lens group of a zoom lens system;
   a light-shield exterior ring which is positioned around said first lens frame;
   a first outer cam groove and a second outer cam groove which are formed on an outer peripheral surface of said cam ring, each said first and second cam grooves including a zooming range for performing a zooming operation of said zoom lens system; and
   a first cam follower formed on said first lens frame, said first cam follower being engaged in said first outer cam groove;
   a second cam follower formed on said light-shield exterior ring, said second cam follower being engaged in said second outer cam groove through a linear guide slot which is elongated in a direction parallel to said optical axis, which is formed on said first lens frame, and
   wherein said first outer cam groove and said second outer cam groove are shaped so as to move said first lens frame and said light-shield exterior ring in the same moving path in said zooming ranges thereof.

2. The zoom lens barrel according to claim 1, further comprising a lens barrier unit including at least one barrier blade,
   wherein said lens barrier unit is supported by said light-shield exterior ring at a front end thereof, and
   wherein retracting ranges of said first outer cam groove and said second outer cam groove are shaped so that said light-shield exterior ring advances from a photographing position thereof relative to said first lens frame to position said lens barrier unit in front of said frontmost lens group without the lens barrier unit interfering with said frontmost lens group when said zoom lens barrel is retracted to a retracted position thereof.

3. The zoom lens barrel according to claim 1, wherein said first lens frame comprises an outer ring portion, an inner ring portion and a flange wall by which a front end of said outer ring portion and a front end of said inner ring portion are connected, and wherein said cam ring is positioned between said outer ring portion and said inner ring portion.

4. The zoom lens barrel according to claim 3, further comprising a second lens frame which is positioned inside said inner ring portion, and is guided linearly along said optical axis, wherein at least one opening, through which the position of a lens group supported by said second lens frame in said optical axis direction, can be adjusted is formed on said first lens frame.

5. The zoom lens barrel according to claim 1, further comprising a biasing member, positioned between said first lens frame and said light-shield exterior ring, for biasing said light-shield exterior ring forward relative to said first lens frame.

6. The zoom lens barrel according to claim 5, wherein said biasing device comprises a compression coil spring.

7. The zoom lens barrel according to claim 4, wherein said opening comprises:

at least one outer opening formed on said outer ring portion, and at least one inner opening formed on said inner ring portion, wherein said outer opening and said inner opening are aligned in a radial direction of said zoom lens barrel.

8. The zoom lens barrel according to claim 1, further comprising a stationary barrel having a female helicoid formed on an inner peripheral surface of said stationary barrel, wherein a male helicoid is formed on an outer peripheral surface of said cam ring to be engaged with said female helicoid, and wherein a spur gear which is engaged with a drive pinion is formed on thread of said male helicoid.

9. The zoom lens barrel according to claim 1, further comprising:

a second lens frame which is positioned inside said inner ring portion, is guided linearly along said optical axis, and includes a third cam follower; and an inner cam groove formed on an inner peripheral surface of said cam ring so that said third cam follower is engaged in said inner cam groove.

10. The zoom lens barrel according to claim 2, wherein the distance in the optical axis direction between said first cam groove and of said second cam groove changes from a predetermined position within a range before said zoom range.

* * * * *